(12) United States Patent
Wu

(10) Patent No.: US 7,089,440 B2
(45) Date of Patent: Aug. 8, 2006

(54) SKEW COMPENSATION FOR A MULTI-AGENT SHARED BUS

(75) Inventor: Leon Li-Heng Wu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 10/721,592

(22) Filed: Nov. 24, 2003

(65) Prior Publication Data

US 2005/0114724 A1    May 26, 2005

(51) Int. Cl.
G06F 1/12 (2006.01)
G06F 1/04 (2006.01)
G06F 13/42 (2006.01)

(52) U.S. Cl. .............. 713/401; 713/401; 713/500; 713/502; 713/503; 714/699; 714/700; 714/704; 714/706; 386/3; 386/18; 386/899; 327/149; 327/153; 327/158; 327/276; 370/517; 370/519

(58) Field of Classification Search .......... 713/400, 713/401, 500, 502, 503; 710/118, 125; 386/3, 386/18, 899; 370/517, 519; 327/149, 153, 327/158, 276; 714/699, 700, 704, 706, 707
See application file for complete search history.

(56) References Cited

U.S. PATENT DOCUMENTS

| 5,150,068 A | 9/1992 | Kawashima et al. |
| 5,317,601 A | 5/1994 | Riordan et al. |
| 5,533,072 A | 7/1996 | Georgiou et al. |
| 5,550,860 A | 8/1996 | Georgiou et al. |
| 5,577,075 A | 11/1996 | Cotton et al. |
| 5,668,830 A | 9/1997 | Georgiou et al. |
| 5,742,798 A | 4/1998 | Goldrian |
| 5,870,441 A | 2/1999 | Cotton et al. |
| 5,999,032 A | 12/1999 | Wang et al. |
| 6,005,428 A | 12/1999 | Amdahl |
| 6,105,144 A | 8/2000 | Wu |
| 6,232,806 B1 | 5/2001 | Woeste et al. |
| 6,577,649 B1 | 6/2003 | Leibowitz et al. |

FOREIGN PATENT DOCUMENTS

| EP | 0543327 A1 | 5/1993 |
| JP | 2000029828 A | 8/2000 |

OTHER PUBLICATIONS

W.C. Erickson, "Automatic Skew Compensator for LSI Clock Circuits," IBM Technical Disclosure Bulletin, 21:7 (1978).

Primary Examiner—Lynne H. Browne
Assistant Examiner—Nitin C. Patel
(74) Attorney, Agent, or Firm—Joseph P. Lally; Cynthia S. Byrd

(57) ABSTRACT

A data processing system includes first, second, and third agents connected to a shared bus. The third agent is able to receive information via the shared bus from the first agent or from the second agent. The third agent includes a skew compensation circuit to determine signal skew in signal received via the shared bus and to compensate for the skew by adding delay into selected signals of the bus. The skew compensation circuit determines whether the first agent or the second agent is the sender of information received by the third agent via the shared bus. The skew compensation circuit alters the skew compensation based on the identity of the sender such that the delay into the bus signals is specific to the corresponding sender.

20 Claims, 6 Drawing Sheets

SKEW COMPENSATION FOR A MULTI-AGENT SHARED BUS

BACKGROUND

1. Field of the Present Invention

The present invention in the field of digital electronic systems and more particularly in the field of multi-agent systems employing shared busses to communicate data among the agents.

2. History of Related Art

In a multi-agent shared bus system, the maximum rate at which data can be sent over the bus is strongly influenced by the amount of signal skew. For purposes of this invention, an agent is defined as any element or component of the system that is connected to the shared bus. An agent can be an individual integrated circuit within its own package. Alternatively, a multiple agent can be a contained within a single package.

Signal skew is inherent in any parallel bus. There are multiple components that contribute to signal skew. Typically, a single clock signal is responsible for clocking multiple (e.g., sixteen) data signals. There is inherent design and fabrication skew, referred to as sending skew, at the sending agent. There are also various paths leading from the sending chip to the receiving chip, each of will contribute to "path skew" due to differences in path length, loading, and signal propagation environment. Finally, there is "receiving skew" that reflects variations in the characteristic delay paths of paths from external IO pads to internal latches. All of these skew elements contribute to the overall skew and substantially limit the transmit speed.

In a multi-agent shared bus environment, the amount of skew is unique to each unique combination of sender and receiver. In a system that includes Agents A, B, and C, for example, the overall skew from Agent A to Agent B is different than the overall skew from Agent B to Agent C. It would be desirable to implement a system that includes skew compensation to minimize the perceived skew at the receiving end. It would be further desirable if the implemented solution accounted for the variations in skew among the various sender-receiver combinations. It would be further desirable if the implemented solution was relatively inexpensive, in terms of die size area, to implement.

SUMMARY OF THE INVENTION

The identified objectives are achieved according to the present invention by an integrated circuit enabled to connected to a shared communication bus in a data processing system. The circuit receives at least first and second data signals from the shared bus. A skew compensation circuit having a set of data delay blocks selectively delays each of the set of data signals to produce a set of edge aligned data signals. The skew compensation circuit includes a first set of data delay blocks and a second set of data delay blocks. The first set of delay blocks is used to insert the signal delay when a first device connected to the shared bus is sending data while the second delay block is used to insert the delay when a second device connected to the shared bus is the sender. In this manner, the selective delay inserted by the skew compensation varies depending upon the sender of data.

Each of the data delay blocks may include a counter that increments if a corresponding data signal transitions before a clock signal. The output of the counter controls the amount of delay inserted into the corresponding data signal. Thus, as the counter increases, the delay increases until, eventually, the data signal will not transition before the clock signal, at which point the counter will no longer increment and the delay will be set. Each data delay block may also have a set of delay buffers connected in series to a data signal. A multiplexer is used to select one of the delay buffer outputs. In this case the counter value provides the select input to the multiplexer.

The skew compensation circuit may also have first and second clock delay blocks and means for selecting the first or second delay blocks depending on the identity of the sender. Each clock delay block is configured to insert delay into the signal path of a clock signal to produce a clock signal edge aligned with the edge aligned data signals. The circuit may further includes a clock latching edge generator to receive the edge aligned clock signal and produce a clocking signal that is delayed relative to the edge aligned data signals. In this case, the clocking signal is preferably delayed a quarter cycle relative to the edge aligned data signals to place the clocking signal transition in the middle of the data phase.

The skew compensation may be achieved using a three phase process. During a first phase, the data delay blocks are active and any clock delay blocks are inactive. All data signals that are early relative to the clock signal are delayed until they are edge aligned with the clock signal. During a second phase, the clock delay block is enabled, the data delay blocks are disabled, and the clock signal is delayed until it is edge aligned with the "latest" of the data signals (i.e., the data signal that transitions last). In the third phase, all data signals are then edge aligned with the clock signal such that the data and clock signals are all edge aligned.

BRIEF DESCRIPTION OF THE DRAWINGS

Other objects and advantages of the invention will become apparent upon reading the following detailed description and upon reference to the accompanying drawings in which.

Figure 1:
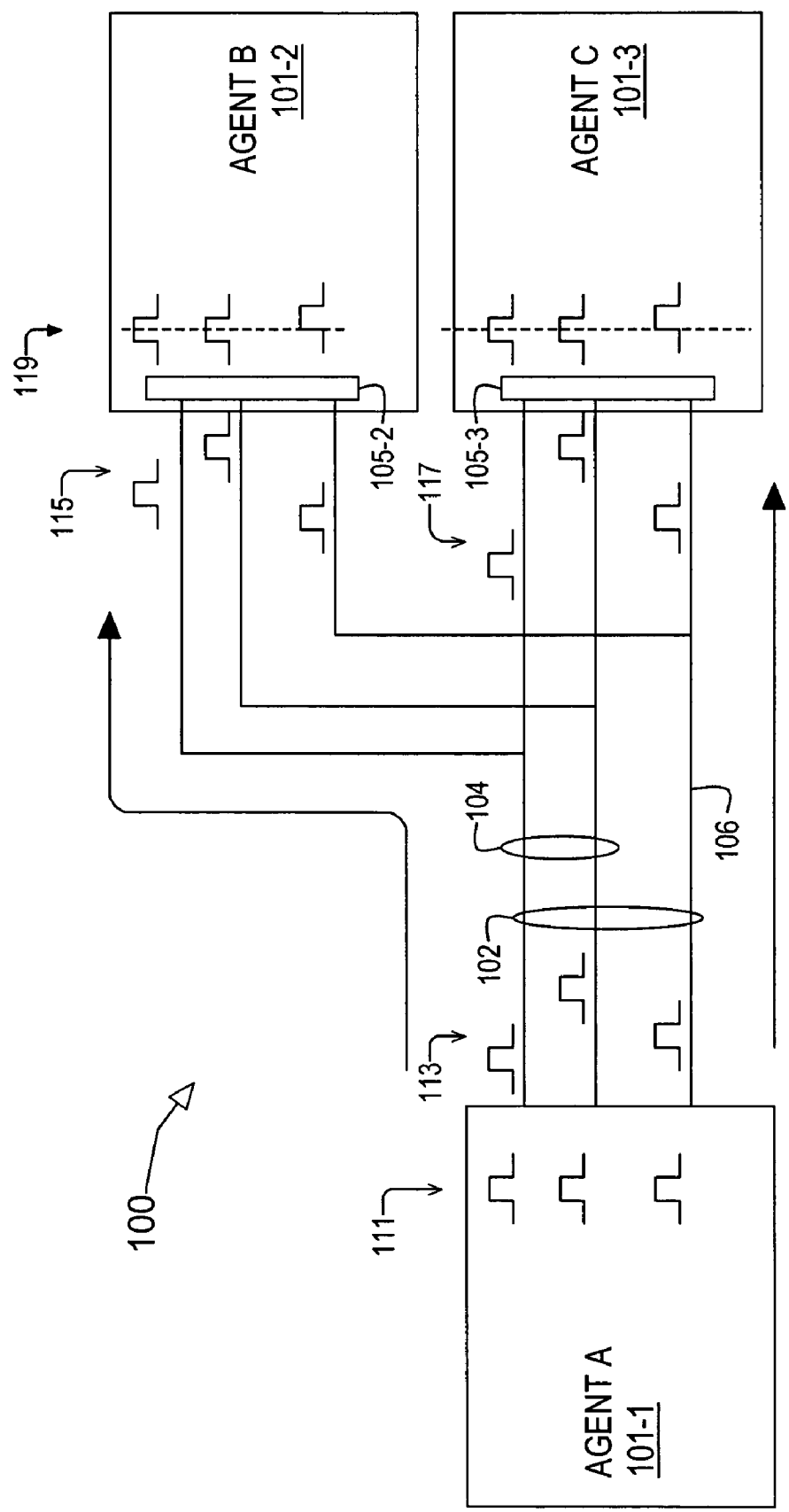
FIG. 1 is a block diagram of selected elements of a multi-agent data processing system according to an embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking the present invention encompasses a system and method for implementing a multi-agent, source-synchronized bus with skew compensation for use in a data processing system. During a skew detection/compensation phase of operation, the relative skew associated with a sender-receiver path (either clock or data) is determined. A controllable amount of delay is then inserted into the data path based on the determined amount of skew. Each sender-receiver path is selectively compensated in this manner to minimize signal skew from the sender to the receiver. This process can be repeated for each sender/receiver path of interest. Importantly, each receiving agent includes multiple delay elements so that a separate amount of programmable delay can be added to each path depending upon the identity of the sender.

Turning now to the drawings, FIG. 1 is a block diagram of selected elements of a multi-agent data processing 100 according to one embodiment of the present invention. In the depicted embodiment, system 100 includes a set of agents 101-1, 101-2, and 101-3 each interconnected by a shared bus 102. In one implementation, each agent 101 is a separately packaged integrated circuit device such as a general purpose microprocessor, a memory device, an application specific integrated circuit, or another integrated circuit. The set of agents may populate the same printed circuit board. Shared bus 102 includes a set of data lines 104 and a clock signal 106. In one embodiment, clock signal 106 is implemented as a differential signal that requires two wires whereas, in other embodiments, clock signal 106 is transmitted via a single wire.

The depicted embodiment illustrates a situation in which agent A 101-1 is the sender and either agent B 101-2 or agent C 101-3 is the receiver. FIG. 1 includes a conceptualized depiction of a set of signals being transmitted from agent 1 101-1 to either agent 2 101-2 or agent 3 101-3. As depicted, the signals are edge aligned (as indicated by reference numeral 111) as they originate from agent 1 101-1. By the time the signals reach bus 102, however, the signals already exhibit some degree of sender skew (reference numeral 113). When the signals reach the other agents (101-2 and 101-3) on bus 102, the skew is typically even greater (reference numerals 115 and 117). Moreover, the skew 115 at the input pins of agent 2 101-2 is different than the skew 117 at the input pins of agent 3 101-3.

Each receiving agent 101-2 and 101-3 includes a skew compensation circuit (105-2 and 105-3 respectively). Compensation circuits 105-2 and 105-3 selectively insert various amounts of time delay into the signal paths of bus 102. When compensation circuits 105 have been configured appropriately, the data signals 104 as they are output from compensation circuit 105 are all edge-aligned or aligned in time (reference numeral 119) and the clock signal is aligned to transition in the middle of each data signal cycle or bit.

In an embodiment that emphasizes multi-agent skew compensation, the skew compensation circuits 105 are configured to customize the inserted delay based upon the identity of the sender, in advance, during bus initialization. Thus, as an example, if agent C 101-3 obtains ownership of bus 102 after agent A 101-1 completes its task, each potential receiving agent (namely, agents 101-1 and 101-2) on bus 102 will then select their corresponding skew compensation delay circuits 105 to compensate for the expected skew when signals are transmitted from agent C 101-3. By enabling each agent 101 to recognize or determine the identity of the current sender and by providing a skew compensation mechanism to insert delay into the signal path of each potential receiver where the inserted delay is specific to the sender-receiver pair, the invention is able to maximize transmission speeds (bandwidth) by substantially nulling out path-specific signal skew.

Figure 2:
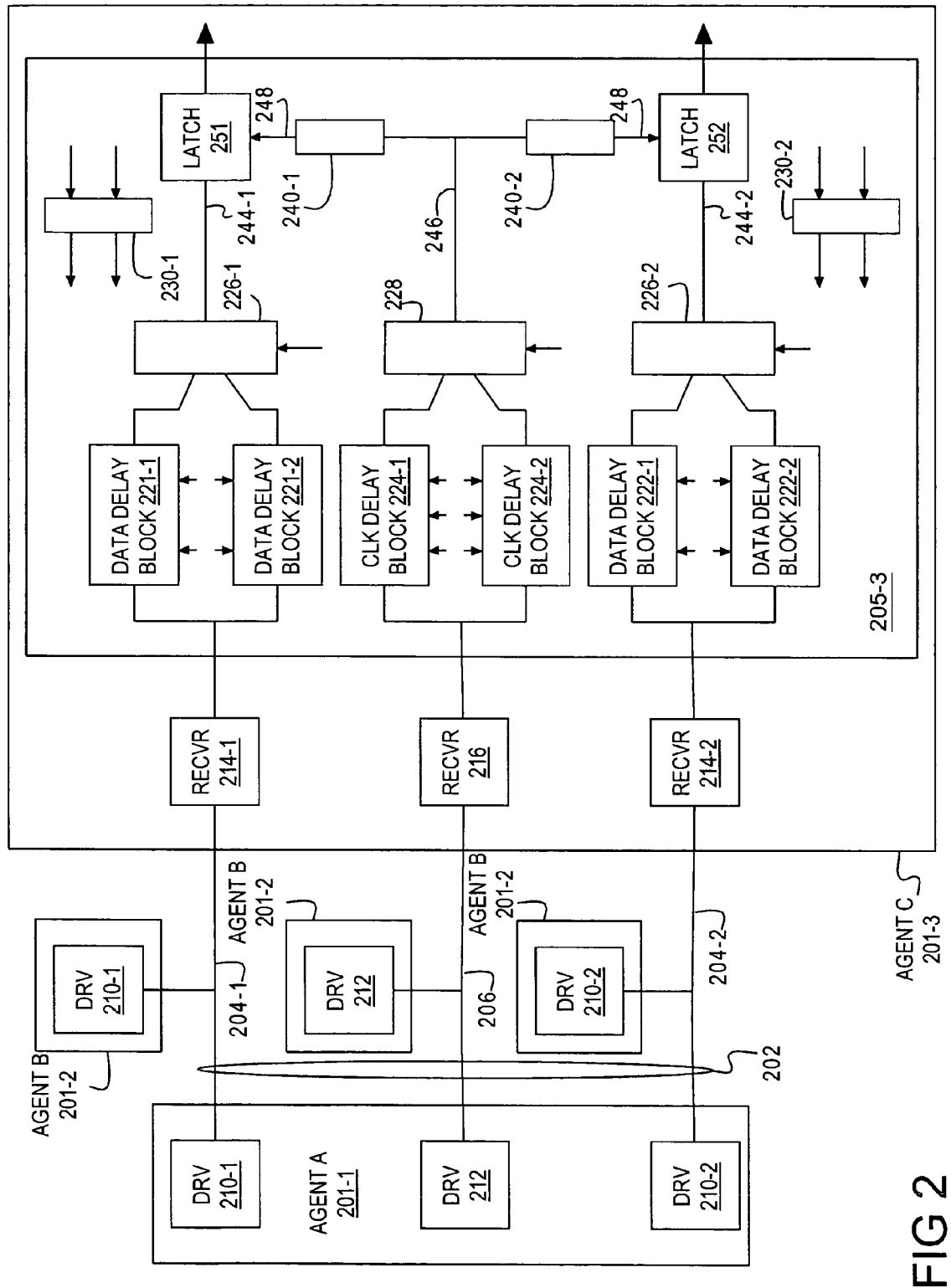
FIG. 2 is a block diagram of a skew compensation circuit of an agent in the system of FIG. 1 according to an embodiment of the invention.

Turning now to FIG. 2, selected elements of a system 200 employing signal skew compensation according to one embodiment of the present invention are illustrated. In the depicted embodiment, system 200 includes a set of three agents 201-1, 201-2, and 201-3. Although three agents 201 are depicted in the illustrated embodiment, the number of agents 201 is implementation specific and may be more (or less) than three. In a likely implementation, each agent 201 is a separately packaged device or integrated circuit. In other embodiments, multiple agents 201 may be integrated within a single device. In one embodiment, agents 201-1, 201-02, and 201-03 of FIG. 2 are equivalent to agents 101-01, 101-02, and 101-03, respectively, of FIG. 1.

Each agent 201 is connected to a shared signal bus 202. Signal bus 202 includes a set of N data lines, two of which are shown (204-1 and 204-2), and a clock signal 206. Each agent 201 includes resources for coupling to signal bus 202. For an implementation in which each agent 201 is an integrated circuit, for example, each agent includes a data input pin (not shown) and a corresponding receiver circuit 214 connected to each data signal of bus 202. Clock signal 206 represents the clock signal that is used to clock data signals 204. There may be other clock signals within bus 202 that are responsible for driving other data signals. In a wide bus (32-bits or more, for example), loading effects generally dictate the use of multiple clock signals with each clock being responsible for clocking a subset of the data signals. For purposes of describing the present invention however, it is sufficient to show a single such clock signal 206. Illustration of two data lines 204 associated with clock 206 is also sufficient to illustrate the invention although as many as sixteen data lines 204 or more may be driven by a single clock signal 206.

With three agents 201 connected to shared bus 202 as depicted in FIG. 2, system 200 is capable of transmitting data over bus 202 in one of six configurations, namely, from Agent A 201-1 to Agent B 201-2, from Agent A 201-1 to Agent C 201-3, from Agent B 201-2 to Agent A 201-1, and so forth. FIG. 2 emphasizes a configuration in which Agent C 201-3 is the receiving agent for data being transmitted from one of the other agents 201-1 or 201-2. In this configuration, the elements of the skew compensation circuit 205-3 of agent 201-3 are illustrated. It should be appreciated, however, that, in a more general implementation, each agent 201 includes a corresponding skew compensation circuit 205 functionally equivalent to the skew compensation circuit 205-3 depicted in FIG. 2.

Agents 201-1 and 201-2 are shown as including driver circuits 210 corresponding to each data signal 204 and a driver circuit 212 for clock signal 206. As the receiving agent, agent 201-3 is shown in FIG. 2 as including a data receiver 214 connected to each data line 204 and a clock receiver 216 connected to clock signal 206. Agents 201-1 and 201-2 also include receiving circuitry (not shown) that is employed when either of the agents is the receiving agent while agent 201-3 includes driver circuitry (not shown) used when agent 201-3 is the sending agent.

The data signals and clock signal produced at the outputs of latches 214 and 216 of agent C 201-3 include signal skew caused by the signal skew sources described above. Agent 201-3 includes a skew compensation circuit 205-3 configured to produce data signals 244 and a corresponding clock signal 246 that are edge aligned to one another. The depicted embodiment of skew compensation circuit 205-3 further includes an additional set of circuits (240-1, 240-2) to delay edge aligned clock signal 246 relative to edge aligned data signals 244 so that the resulting delayed clock signal 248 transitions in the middle of the data signal cycles.

The depicted embodiment of skew compensation circuit 205-3 includes data delay blocks (221, 222), clock delay blocks 224, skew compensation signal generators 230, clock latching edge generators 240-1, 240-2, and multiplexers 226 and 228. Each of these elements is described in greater detail below.

Each data signal 204 is connected, through its corresponding receiver 214, to a set of data delay blocks. In the depicted embodiment, data signal 204-1 is connected to data delay block 221-1 and 221-2 and data signal 204-2 is connected to data delay block 222-1 and 222-2. The number of data delay blocks (221 or 222) to which each data signal 204 is connected reflects the number of agents 201 that are connected to the shared bus. Generally speaking, skew compensation circuit 205 includes a set of data delay blocks (221 or 222) for each data signal 204. Each set of data delay blocks includes an individual data delay block for each other agent 201 to which Agent C 201-3 is connected via bus 202. Thus, because FIG. 2 illustrates a set of three agents 201 connected to bus 202, each set of data delay blocks (221, 222) includes two individual control blocks. A first control block 221-1 or 222-1 is active when Agent A 201-1 is the sending agent and a second control block Agent B 221-2 or 222-2 is used when agent 201-2 is the sending agent.

Each data delay block 221 or 222 inserts a controlled amount of delay into the corresponding signal path. The set of control blocks 221 or 222 are configured to insert specific amount of delay into each path of data signal 204 to produce a set of edge aligned data signals 244. The amount of delay inserted into each data path is determined by the amount of skew that exists between data signals under the specific combination of sending and receiving agents.

Similar in function to data delay blocks 221 and 222 is the set of clock control blocks 224 (one for each other agent 201). Each clock delay block 224 inserts delay into the path of clock signal 206 to produce a clock signal 246 that is edge aligned to edge aligned data signals 244. Data multiplexers 226 select the data delay blocks 221 and 222 corresponding to the sending agent 201 while clock multiplexer 228 selects the clock delay block 224 corresponding to the sending agent. The outputs of multiplexers 226 are a set of edge aligned data signals 244 and an edge aligned clock signals 246. The outputs of the multiplexers 226 are provided to the inputs of respective latching circuits 251 and 252 while the edge aligned clock signal output by multiplexer 228 is connected to a set of clock latching edge generators 240. The output of clock latching edge generators 240 provide the clock signals for corresponding latching circuits 251 and 252. The outputs of latching circuit 251 and 252 are provided to the functional circuitry (not depicted) of agent 201-3. The set of skew compensation signal generators 230 produces a set of control signals for the data delay blocks 221 and 222 and the clock delay block 224. Details of each of these elements is described below.

Figure 3:
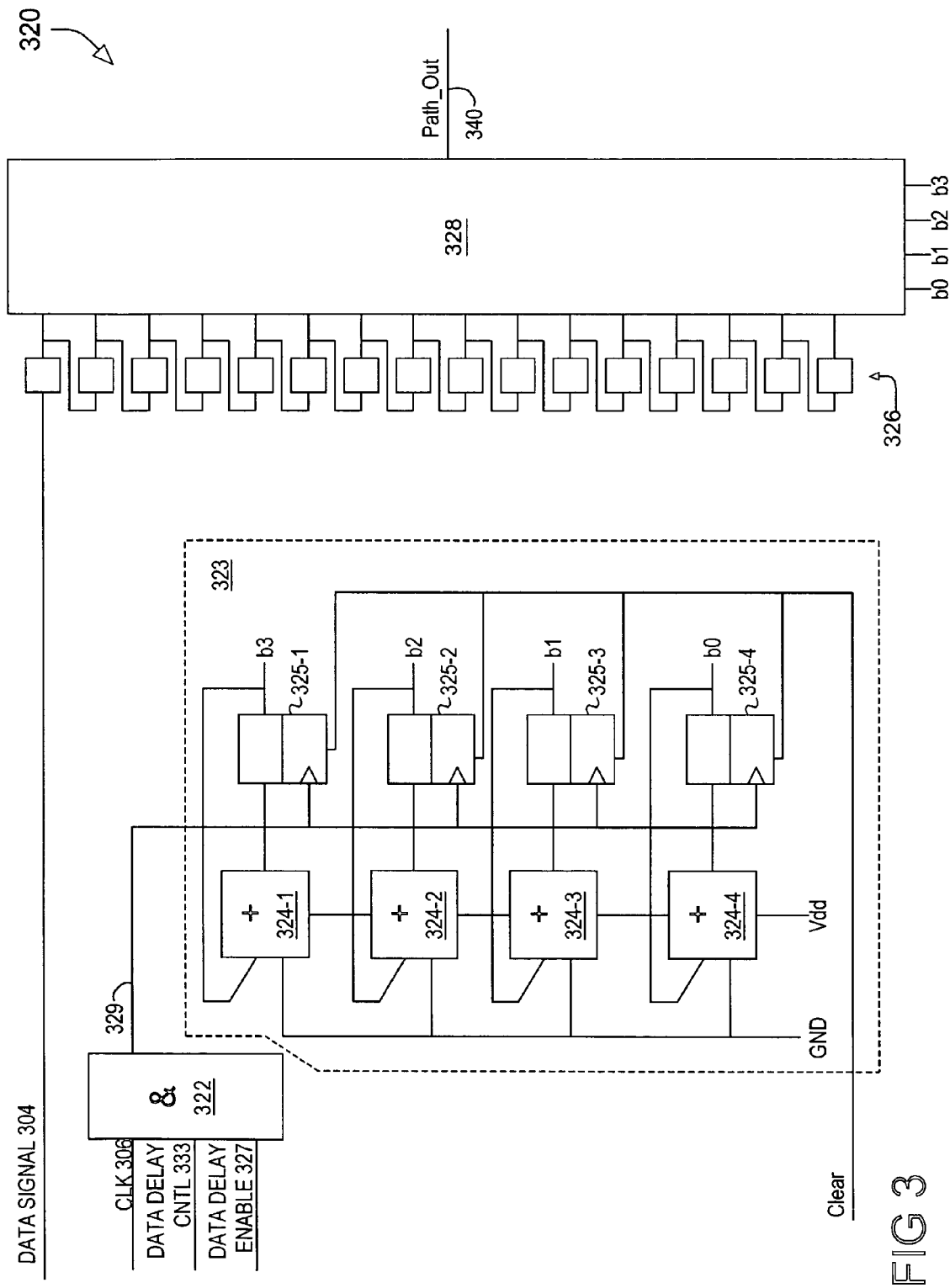
FIG. 3 is a block diagram of a data delay block used in the compensation circuit of FIG. 2.

Referring now to FIG. 3, an exemplary embodiment of a data delay block 320 suitable for use in the set of data delay blocks 221 and 222 in FIG. 2 is depicted. Generally speaking, data delay block 320 detects the amount of skew between a data signal 304 and its corresponding clock signal 306, in conjunction with data delay control signals 333 derived by compensation signal generator 430 as described below with respect to FIG. 4, and inserts delay into the data signal path sufficient to compensate for the skew so that the delayed data signal 340 produced at the output of data delay block 320 is edge aligned with the clock signal and all of the other data signals as well.

The depicted embodiment of data delay block 320 includes an AND gate 322, a 4-bit counter circuit 323, a set of 16 delay buffers 326 and a 16:1 multiplexer 328 that selects the output of one of the delay buffers 326 as delayed data signal 340. The AND circuit 322 receives a clock signal 306, a control signal 333, and an enable signal 327 as its inputs. The output of AND circuit 322 provides the input signal to 4-bit counter 323. When data delay circuit 322 is enabled (i.e., data delay enable signal 327 is asserted) and data delay control signal 333 is asserted, the output of AND gate 322 tracks the input of the clock signal 306 and causes the 4-bit output of counter 323 to increment with each transition of the clock signal 306. The 4-bit counter 323 includes a set of four simple adders 324 and a set of four clearable latches 325. The output of the set of latches 325 represents the output of the 4-bit counter. The 4-bit counter provides a 4-bit input to multiplexer 328 and determines which of the sixteen delay buffers 326 will provide the delayed output signal 340. Delay buffers 326 are serially arranged wherein the output of one delay buffer 326 provides the input to the next delay buffer such that the output of each successive delay buffer transitions at one "delay buffer unit" later than the previous buffer 326. A delay buffer unit represents the amount of delay attributable to each delay buffer 326. Delay buffer 326 preferably includes a capacitive or other delay inducing element.

The enable signal 327 is asserted during an alignment stage of the skew compensation process. During this alignment stage, the skew among data signals 304 and their clock signal is determined and used to set the 4-bit output of counter 323 and thereby simultaneously set the control inputs to multiplexer 328 to select the necessary amount of delay.

One embodiment of the present invention contemplates a three-stage process for adjusting the skew of data signals 204 (FIG. 2) and clock signal 206 to produce edge aligned clocks signals 244 and clock signal 246. During a first stage, all data lines 204 that are "early" with respect to clock signal 206 are delayed until they are edge aligned with the clock signal. During this stage, the data delay blocks 221 and 222 are active and clock delay block 224 is disabled. During a second stage, clock delay block 224 is activated to insert delay into clock signal 206 until it is edge aligned with the "latest" of the data signals 204 (assuming that at least one data signal 204 is later than clock signal 206). Once the clock signal 206 is edge aligned to the latest data signal 204, the data delay blocks 221 and 222 are activated again to align all of the data signals 204 with the clock signal 206.

Each stage of the process described above uses 16 cycles corresponding to the sixteen possible values of the 4-bit counters 323 (FIG. 3) in the data delay block 320. Thus, the granularity or range of delay that is provided by data delay block 320 is a function of the number of bits in counter 323, which corresponds to the number of delay buffers 326 that feed multiplexer 328. This granularity or range is implementation specific and the counter 323 may employ more or fewer bits than four (and more or fewer than sixteen delay blocks).

Figure 4:
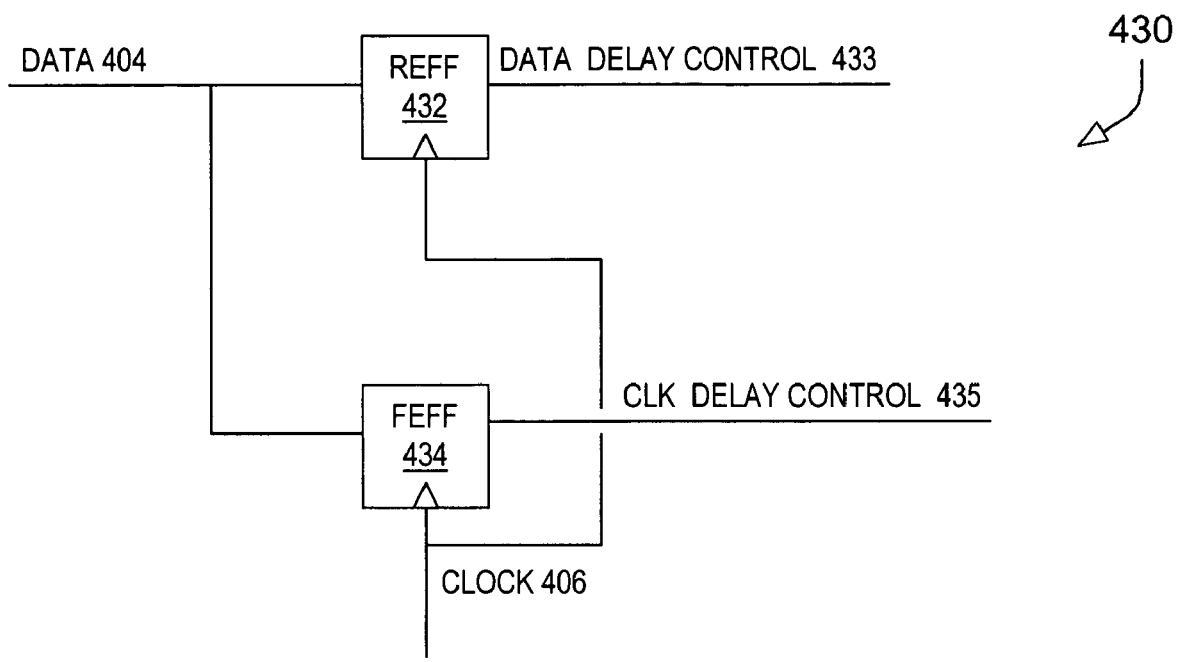
FIG. 4 is a block diagram of a compensation signal generator of the skew compensation circuit of FIG. 2.

Referring now to FIG. 4, an embodiment of compensation signal generator 430 suitable for use as the set of compensation signal generators 230 (of FIG. 2) is shown. Each compensation signal generator 430 receives a corresponding data signal 404 and a clock signal 406. During the skew compensation stage, an alternating data pattern is used so that the data signal transitions at periodic intervals such as every clock cycle, once every two clock cycles, or once every four clock cycles (as examples).

In FIG. 4, compensation signal generator 430 includes a rising edge flip flop (REFF) 432 and a falling edge flip flop (FEFF) 434. REFF 432 and FEFF 434 both receive a data signal 404 as their respective inputs and both are clocked by a clock signal 406. If the data signal transitions high before the rising edge of clock signal 406 (i.e., data signal 404 is early with respect to clock signal 406), the data delay control signal 433 is asserted. If, on the other hand, the falling edge of clock signal 406 occurs before the falling edge of data signal 404 (i.e., data signal 404 is late with respect to clock signal 406), the clock delay control signal 435 is asserted. The clock and data control signals 433 and 435 thus provide an indication of the relative position of the corresponding data signal 404 and clock signal 406.

Data control signal 433 is provided to control input 333 of AND circuit 322 of FIG. 3. When enable signal 327 is asserted, output signal 329 of AND circuit 322 will transition with clock signal 306 if the data signal 304 is earlier than the clock signal. Each high transition of AND circuit output signal 329 will increment the 4-bit output of counter 323 and thereby increase the delay inserted into the signal. Eventually, the delay inserted into the data signal path will cause data signal 340 at the output of multiplexer 328 to align with the clock signal 306, at which point control signal 333 will de-assert thereby preventing additional incrementing of counter 323 and any additional delay of data output signal 340.

Figure 5:
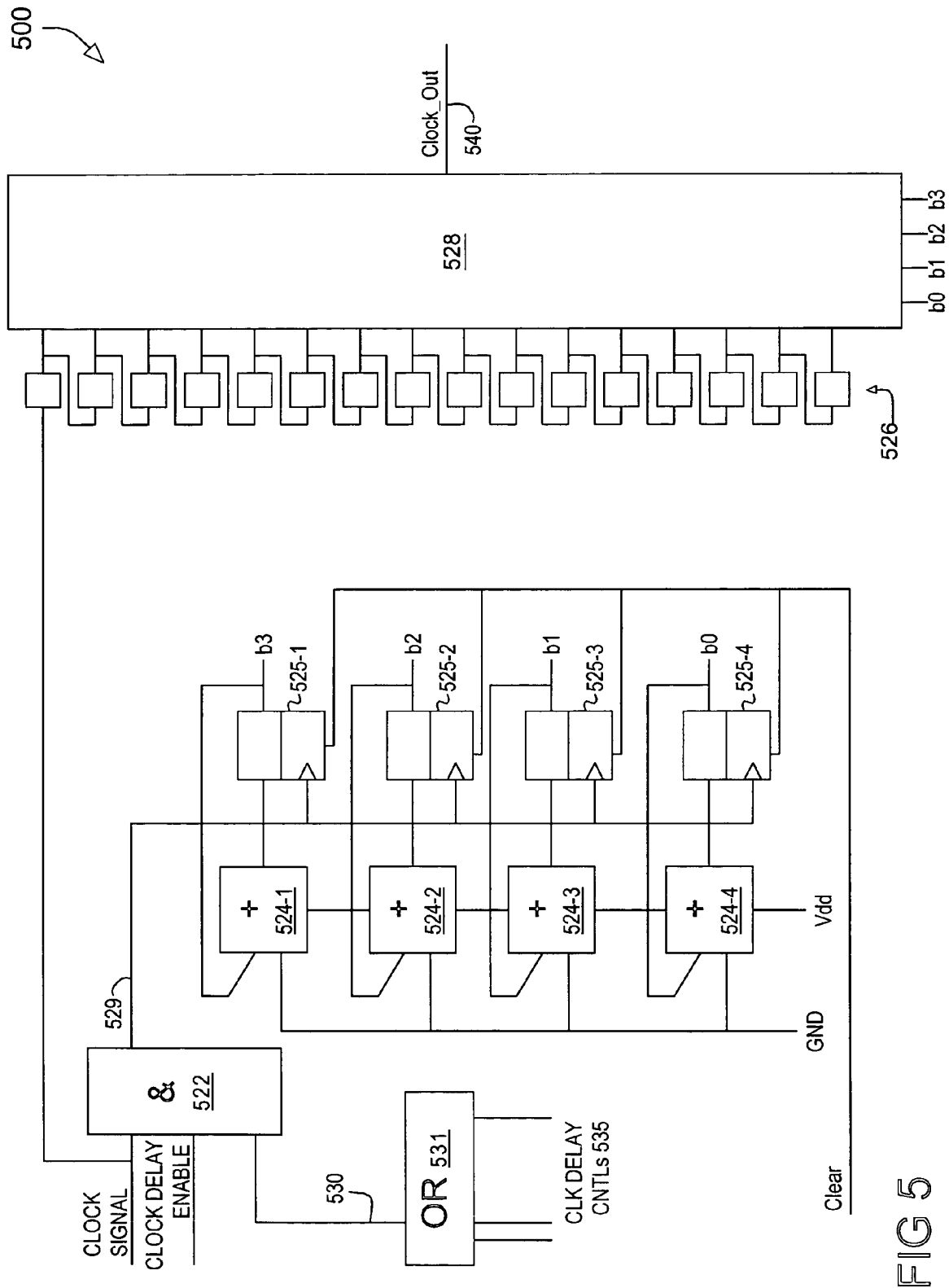
FIG. 5 is a block diagram of a clock delay block used in the skew compensation circuit of FIG. 2.

Referring now to FIG. 5, selected elements of an embodiment of a clock delay block 500 suitable for use as clock delay block 224 of FIG. 2 is depicted. Whereas the input to data delay block 320 of FIG. 3 (i.e., the signal to be delayed) is a data signal 304, the input to clock delay block 500 of FIG. 5 is the clock signal. In the depicted embodiment, clock delay block 500, with the exception of OR circuit 531, contains substantially the same elements as those shown in data delay block 320 of FIG. 3. Whereas one of the inputs to AND circuit 322 of FIG. 3 is the data delay control signal 333 produced by the corresponding compensation signal generator 430 (FIG. 4), AND circuit input 522 of FIG. 5 receives one of its input signals from output signal 530 produced by OR circuit 531. OR circuit 531 includes a set of inputs 535 that receive the set of clock delay control signals 435 produced by the set of compensation signal generators 430 (FIG. 4). By logically OR'ing the clock delay control signals, the clock delay block 500 generates a clock signal delay based on the worst case skew. More specifically, in the three phase signal skew compensation procedure described above, each "early" data signal is first delayed until it is edge aligned with its corresponding clock signal. Next, the clock signal is delayed until it aligns with the latest of the late data signals. Finally, all data signals are then aligned to the clock signal. OR circuit 531 is used to produce a clock delay value that aligns the clock with the latest of the data signals.

Returning now to FIG. 2, the edge aligned clock signal 246 output from clock multiplexer 228 is provided to a set of clock latching edge generators 240 (one for each edge aligned data signal 244). Clock latching edge generators 240 are designed to delay the edge aligned clock signal 246 by a quarter cycle relative to the edge aligned data signals 244 so that the transition edge of the resulting clock signal 248 occurs in the middle of a data cycle. Placing the clock latching edge in the middle of a data cycle minimizes the probability of detecting the incorrect data level. When clock transition occurs close to the data signal transition edge, the clock signal can latch in an erroneous value for various reasons including unexpectedly slow transition times (rise times and fall times) and so forth. Placing the latching edge of clock signal 248 in the middle of the data cycle maximizes immunity to noise and other effects.

Figure 6:
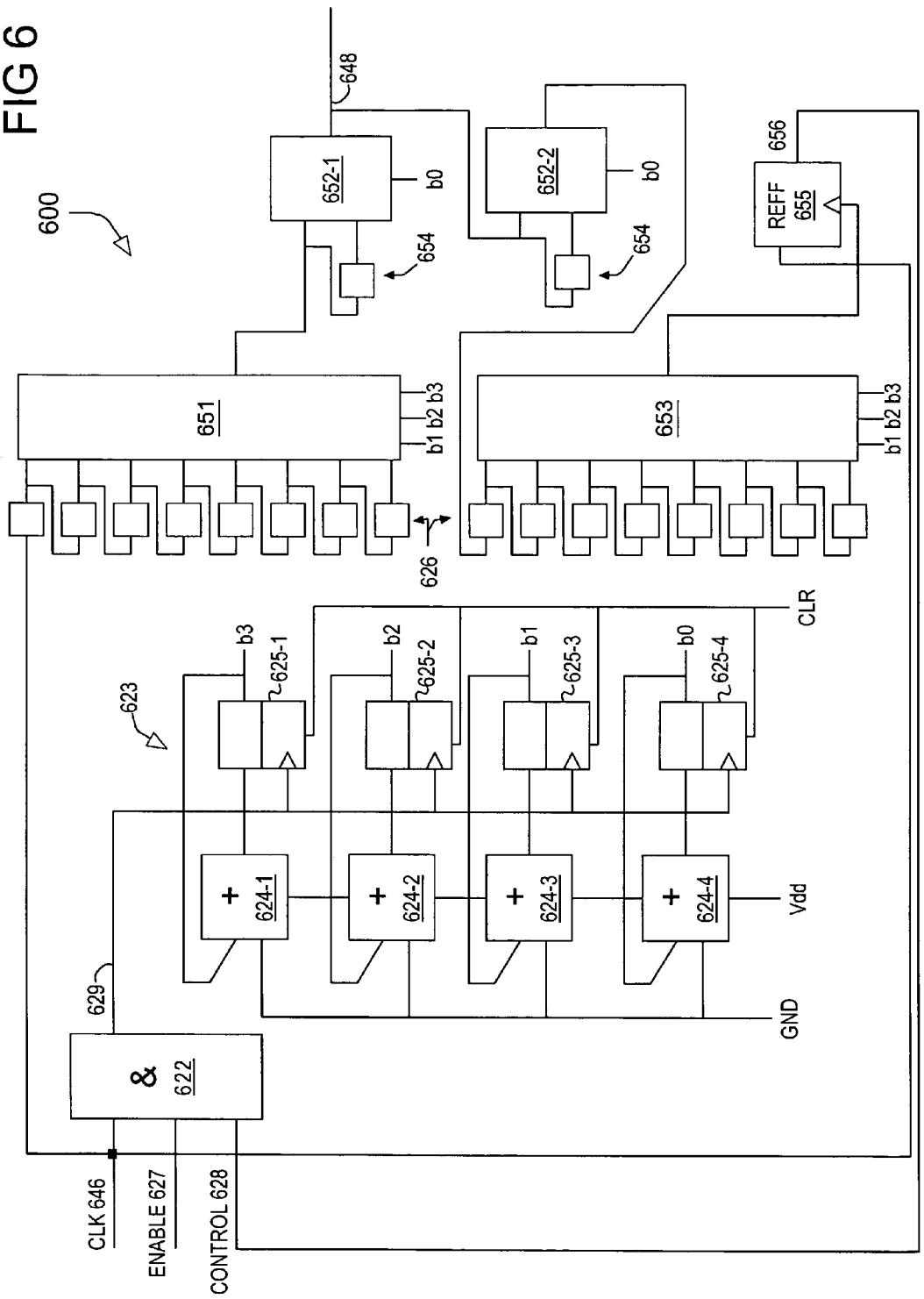
FIG. 6 is a block diagram of a clock latching edge generator of the skew compensation circuit of FIG. 2.

Referring now to FIG. 6, an embodiment of a clock latching edge generator 600 suitable for use as the clock latching edges 240-1 and 240-2 in skew compensation circuit 205 of FIG. 2 is depicted. In the depicted embodiment, the clock latching edge signal 648 produced at the output of generator 600 is generated from edge aligned clock signal 646, which is connected to the output of clock multiplexer 228 in FIG. 2 (thus, the edge aligned clock signal 646 of FIG. 6 is the edge aligned clock signal 246 of FIG. 2). Clock signal 646, as well as an enable signal 627 and a control signal 628, provide inputs to an AND circuit 622. The output 629 of AND circuit 622 is input to a 4-bit counter 623 comprised of a set of adder circuits 624 and a set of clearable latch circuits 625 analogous to the 4-bit counters described earlier.

The 4-bit count value generated by counter 623 provides the inputs to three multiplexer circuits of generator 600. The multiplexers include first and third multiplexers 651 and 653 and a pair of second multplexers 652-1 and 652-2. First and third multiplexers 651 and 653 are 8:1 multiplexers while each of the second multiplexer 652 is a 2:1 multiplexer. The outputs from a set of eight, serial-connected delay buffers 626 provide the inputs to first and third multiplexers 651 and 653 while the outputs of a pair of serial connected delay buffers 654 provide the input to each of the second multiplexer 652. The delay buffers 626 are "full unit" delay buffers while the delay buffers 654 are half-unit delay buffers. The output of first multiplexer 651 is selected based on the high-order (most significant) bits of 4-bit counter 623. The output of first multiplexer 651 is the input to the first half unit delay buffer 654 of second multiplexer 652-1. The least significant bit of 4-bit counter 623 selects the output of second multiplexers 652-1 and 652-2. The output of second multiplexer 652-1 is not only the clock latching edge signal 648, but also the input to the second multiplexer 652-2. The output of second multiplexer 652-2 provides the input to the first of the set of delay buffers 626 of third multiplexer 653. The output of third multiplexer 653 (like the output of first multiplexer 651) is selected based on the high order bits of counter 623. The output of third multiplexer 653 provides the clocking signal to a rising edge flip flop (REFF) 655, which receives the clock signal 646 as its input. The output of REFF 655 provides the control signal 628 to AND circuit 622.

From a functional perspective, circuit 600 generates an output clock signal that is delayed approximately ¼ of a cycle from its input signal. Initially, when counter 623 is reset to a value of zero, the output of third multiplexer 653 is slightly delayed from the clock signal itself by the unit delays introduced by delay buffers 626 and half delay buffers 654. The slight delay causes REFF 655 to assert its output signal 656 thereby causing counter 623 to increment. When counter 623 increments, the delay increases. This pattern continues until the rising edge of the output of third multiplexer 653 is aligned with the falling edge of the clock signal 646. The multiplexers 651 through 653 and their corresponding delay circuits 626 and 654 act as a divider circuit such that the delay between the output clock signal 648 and clock signal 646 is half of the delay between the output of third multiplexer 653 and the input clock signal 646. When the counter 623 reaches this equilibrium state, output clock signal 648 is delayed from input clock signal 646 by a quarter of the clock's period.

It will be apparent to those skilled in the art having the benefit of this disclosure that the present invention contemplates a mechanism for compensating for signal skew in a multi-agent shared bus environment. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. An integrated circuit suitable for connecting to a shared communication bus, comprising:
   means for receiving a set of data signals, including first and second data signals, from the shared bus;
   a skew compensation circuit including a set of data delay blocks configured to selectively delay each of the set of data signals to produce a set of edge aligned data signals; and
   wherein the skew compensation circuit includes a first set of data delay blocks and means for selecting the first set of delay blocks when a first device connected to the shared bus is a sender of data and second delay block and means for selecting the second delay block when a second device connected to the shared bus is the sender wherein the selective delay inserted by the skew compensation varies depending upon the sender of data.

2. The integrated circuit of claim 1, wherein each of the data delay blocks includes a counter configured to increment if a corresponding data signal transitions before a clock signal and further wherein the output of the counter controls the amount of delay inserted into the corresponding data signal.

3. The integrated circuit of claim 2, wherein each data delay block further includes a set of delay buffers connected in series to a data signal and means for selecting one of the delay buffer outputs as the delay block output based on the value of the counter.

4. The integrated circuit of claim 3, wherein each delay buffer output provides an input to a multiplexer and wherein the output of the counter provides the select input to the multiplexer.

5. The integrated circuit of claim 1, wherein the skew compensation circuit further includes first and second clock delay blocks and means for selecting the first or second delay blocks depending on the identity of the sender, wherein each clock delay block is configured to insert delay into the signal path of a clock signal to produce a clock signal edge aligned with the edge aligned data signals.

6. The integrated circuit of claim 5, further comprising a clock latching edge generator to receive the edge aligned clock signal and produce a clocking signal that is delayed relative to the edge aligned data signals.

7. The integrated circuit of claim 6, wherein the clocking signal is delayed a quarter cycle relative to the edge aligned data signals.

8. A data processing system, comprising:
   first, second, and third agents connected via a shared bus;
   wherein the third agent is configured to receive information via the shared bus from the first agent and from the second agent;
   wherein the third agent includes a skew compensation circuit to determine signal skew associated with signals received via the shared bus and to compensate for the determined skew by adding appropriate delay into selected signals of the bus; and
   wherein the skew compensation circuit is enabled to identify the first agent or the second agent as the sender of information received by the third agent via the shared bus and wherein the skew compensation circuit is further enabled to alter the skew compensation based on the identity of the sender wherein the added delay is specific to the corresponding sender.

9. The system of claim 8, wherein the skew compensation circuit includes a set of data delay blocks configured to selectively delay each of the set of data signals to produce a set of edge aligned data signals.

10. The system of claim 9, wherein the skew compensation circuit further includes a first set of data delay blocks and means for selecting the first set of delay blocks when a first device connected to the shared bus is a sender of data and second delay block and means for selecting the second delay block when a second device connected to the shared bus is the sender wherein the selective delay inserted by the skew compensation varies depending upon the sender of data.

11. The system of claim 9, wherein each of the data delay blocks includes a counter configured to increment if the corresponding data signal transitions before a clock signal and further wherein the output of the counter controls the amount of delay inserted into the corresponding data signal.

12. The system of claim 11, wherein each data delay block further includes a set of delay buffers connected in series to a data signal and means for selecting one of the delay buffer outputs as the delay block output based on the value of the counter.

13. The system of claim 12, wherein each delay buffer output provides an input to a multiplexer and wherein the output of the counter provides the select input to the multiplexer.

14. The system of claim 9, wherein the skew compensation circuit further includes first and second clock delay blocks and means for selecting the first or second delay blocks depending on the identity of the sender, wherein each clock delay block is configured to insert delay into the signal path of a clock signal to produce a clock signal edge aligned with the edge aligned data signals.

15. The system of claim 14, further comprising a clock latching edge generator to receive the edge aligned clock signal and produce a clocking signal that is delayed relative to the edge aligned data signals by a quarter cycle.

16. A skew compensation circuit, comprising:
   a first set of data delay blocks including a data delay block corresponding to each of a set of data signals of a shared communication bus to which the circuit is coupled;
   a second set of data delay blocks including a data delay block corresponding to each of the set of data signals;
   wherein each data delay block is configured to insert a variable amount of time delay into the signal path of the delay block's corresponding data signal; and
   multiplexers configured to select between the first and second set of data delay blocks.

17. The circuit of claim 16, further comprising a first and a second clock delay block, each configured to receive a clock signal and wherein each data delay block is configured to insert a variable amount of time delay into the signal path of the delay block's corresponding data signal.

18. The circuit of claim 17, wherein the data delay blocks and the clock delay blocks insert delay into their corresponding signals to produce a set of edge aligned data signals and an edge aligned clock signal.

19. The circuit of claim 18, further comprising a clock edge generator circuit to produce a clocking signal delayed one quarter cycle from the edge aligned clock signal and wherein the edge aligned data signals provide inputs to respective latches and wherein each of the respective latches is clocked by the clocking signal.

20. The circuit of claim 16, wherein each of the data delay blocks includes a counter configured to increment if a corresponding data signal transitions before a clock signal and further wherein the output of the counter controls the amount of delay inserted into the corresponding data signal.

* * * * *